Patented May 31, 1927.

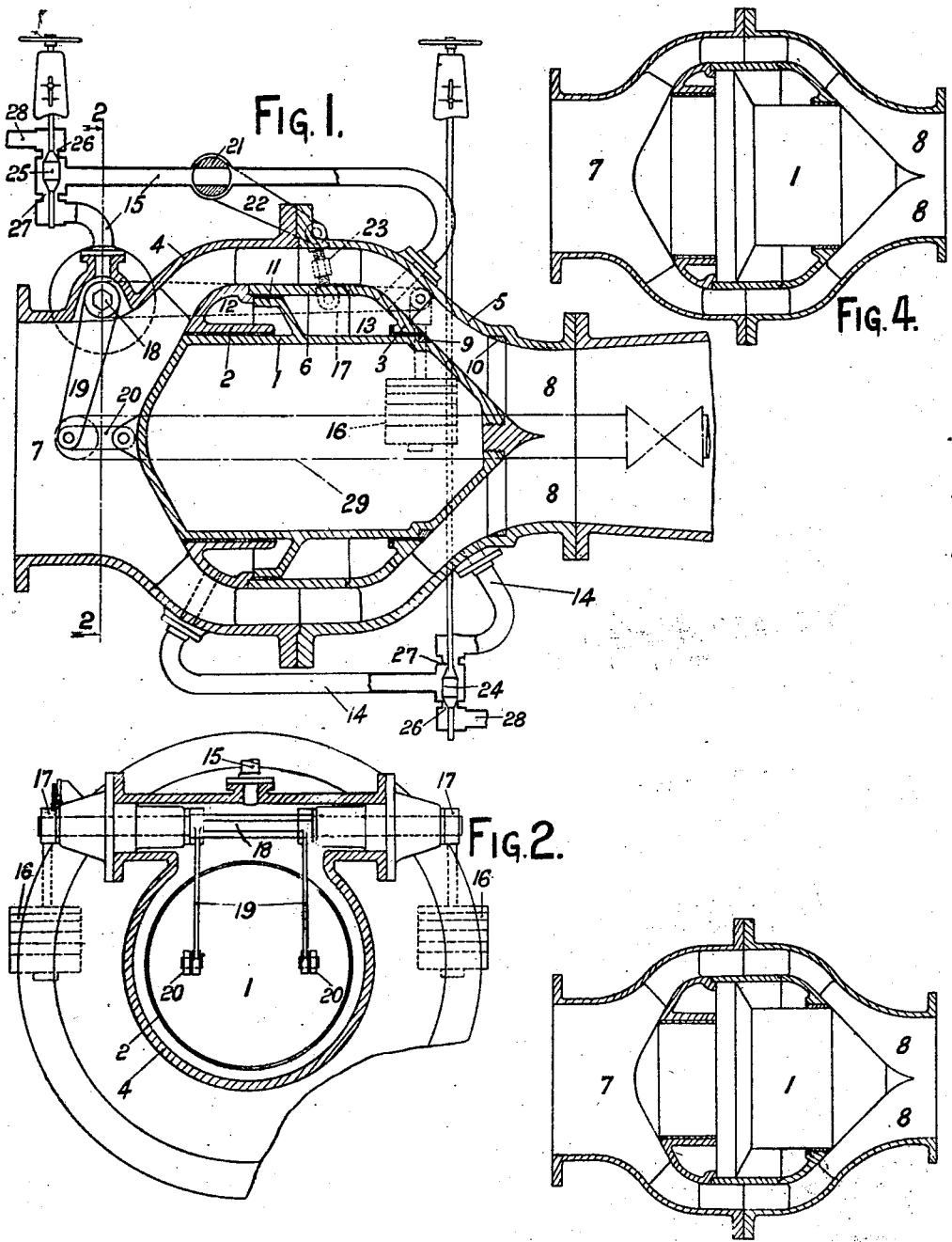

1,631,059

UNITED STATES PATENT OFFICE.

OWEN ALFRED PRICE, OF KILMARNOCK, SCOTLAND.

AUTOMATIC SELF-CLOSING VALVE.

Original application filed June 26, 1926, Serial No. 118,852, and in Great Britain June 27, 1925. Divided and this application filed December 10, 1926. Serial No. 153,906.

This invention relates to an automatic self-closing valve to serve inter alia as an accident valve in a water main or in a water power penstock as a precaution against pipe bursts, or in any hydraulic system where automatic closing is required on occasion of a given excess of the rate of flow or any other change of flow conditions, such, for example, as reversal of flow. This application is a division of application, Serial Number 118,852, filed June 26, 1926.

An object of the invention is to provide such a valve which offers the minimum resistance to the normal flow and which will close with certainty on change of the conditions of flow without dependence on the operation of paddles, trip gear or actuating weights, or on the opening of cocks to hydraulic cylinders or on any mechanical movements, eliminating risk of failure to function due to sticking or breaking of mechanical parts or to errors of adjustment—a risk which must be reckoned with in view of the extreme rarity of the occasions on which operation of the valve is required and of the impossibility of testing it under such conditions as arise during an accident.

In the accompanying drawings Fig. 1 is a vertical section illustrating diagrammatically an automatic self-closing valve according to the invention; Fig. 2 is a fragmentary section on the line II—II of Fig. 1; Figs. 3 and 4 are sections to a smaller scale, showing modified constructions of the valve proper.

As shown, the valve proper is constituted as a plunger 1 which is slidable within a stationary structure comprising annuli 2, 3 cast integral, respectively, with the sections 4, 5 of the valve chest, and an annulus 6 interposed between the annuli 2, 3 and coaxial therewith. The plunger 1 and annular structure 2, 3, 6 present a stream-lined body interposed in the conducting channel immediately in advance of a throat 8 or zone of less cross-sectional area than the main channel. As will be understood, when flow takes place the back of the plunger 1 is subject to the full pressure in the main 7 and the front of the plunger is subject to the lower pressure in the throat 8.

The front of the plunger 1 is fitted with a ring 9 in axial register with a seat ring 10 fitted to the section 5 of the valve chest.

Integral with the plunger 1 is a balancing piston 11 slidable within the annulus 6 and dividing the annular space between the plunger 1 and the structure 2, 3 and 6 into two compartments 12, 13. The compartment 12 is connected with the throat 8 by way of a valved pipe 14, and the compartment 13 is connected with the main 7 by way of a valved pipe 15.

The several areas of the plunger ends and balancing pistons are so proportioned that the total fluid pressure tending to close the valve is greater than the total fluid pressure tending to open it, that is, the sum of the forces acting on the back of the plunger 1 and on the back of the piston 11 is greater than the sum of the forces acting on the front of the plunger 1 and on the front of the piston 11, the plunger being supported approximately in equilibrium by these opposing forces.

To hold the plunger 1 stable for any required stream velocity, there is provided a pair of counterweights 16 carried externally of the valve chest at the free ends of a pair of levers 17 secured to a spindle 18 which is journalled in the chest section 4 and which is connected to the back of the plunger 1 by cranks 19 and links 20, the counterweights 16 being adjustable to balance the closing effort at the particular velocity desired.

The arrangement of the piston 11 in the structure 2, 3, 6 provides a dash-pot serving to cushion the closing movement of the plunger 1, so that the possibility of too rapid closure of the valve is precluded.

A throttle member 21 connected by a crank 22 and adjustable link 23 to either lever 17 is adapted to constrict the passage afforded by the pipe 15 as the plunger 1 moves towards closing position whereby to increase gradually the cushioning effect.

Located in the pipes 14 and 15, respectively, are exhaust valves 24 and 25 by manipulation of which the main valve may be controlled. Each valve 24 or 25 is adapted to seat on either of two seats 26 or 27, the seat 26 opening into an exhaust branch 28 and the seat 27 opening into the part of the pipe 14 or 15 leading to the throat 8 or main 7. With this arrangement, by lifting the valve 25 from the seat 26 water under pressure in the compartment 13 is released to exhaust whereupon the main valve closes. The main valve may be re-opened by restoring the valve 25 on to engagement with its seat 26 and lifting the valve 24 from its seat 26. 28 denotes the usual valve bypass.

The pipe 14 is shown connected to the valve chest upstream of the seat ring 10. With this arrangement as the column of water in the main 7 is brought to rest, due to the closing of the valve, the pressures on the two sides of the balancing piston 11 and on the back of the plunger approach the static pressure due to the head of water upstream of the valve, that is, the various pressures are equalizing, and, at the instant of closure, the net closing force is that due to the static pressure acting on an area equal to that enclosed within the seat ring 10. This powerful closing force, is, of course, built up very gradually and only comes into action at the last moment to force the valve on its seat. Where very high head exists, and undesirably rapid closing is likely to result, the pipe 14 is connected to the valve chest desirably on the downstream side of the ring 10.

In the modified construction shown in Fig. 3 the back end of the plunger 1 is of smaller diameter than the front end, such a construction being suitable for installation in a main in which the normal stream velocity is high and consequently the reaction pressure on the back of the plunger of considerable magnitude.

The modified construction of valve shown in Fig. 4 is suitable for installation in a main in which the normal stream velocity is low, the back end of the plunger 1 being of greater diameter than the front end.

What I claim is:—

1. An automatic self-closing valve, comprising, in combination with a main conducting channel for fluid having a zone of less cross-sectional area than that of the remainder of the channel, a valve-forming plunger movable in said channel in the vicinity of said zone, said plunger having its closing movement in the direction towards said zone, said plunger exposed at its opposite ends to the pressures in said main channel and in said zone, an annular body surrounding said plunger and forming with said plunger a structure of stream-line form spaced from the internal wall of said channel, a balancing piston movable with said plunger, between said plunger and said annular body, the side of said piston nearest to said zone being subject to the pressure in said main channel and the other side of said piston being subject to the pressure in said zone, and means serving normally to hold said plunger stable in open position but adapted to be overcome on predetermined variation of the differential pressure between the main channel and said zone occasioned by change of the conditions of flow, to permit unaided automatic closing movement of said plunger.

2. An automatic self-closing valve, comprising, in combination with a main conducting channel for fluid having a zone of less cross-sectional area than that of the remainder of the channel, a valve-forming plunger movable in said channel in the vicinity of said zone, said plunger having its closing movement in the direction towards said zone, said plunger exposed at its opposite ends to the pressures in said main channel and in said zone, an annular body surrounding said plunger and spaced from the internal wall of said channel, a balancing piston movable with said plunger and bearing on said annular body, connections between the opposite sides of said piston and the main channel and zone, a throttle device in the connection between said main channel and one side of the piston, said throttle device being operatively connected to said plunger, and means serving normally to hold said plunger stable in open position but adapted to be overcome on predetermined variation of the differential pressure between the main channel and said zone occasioned by change of the conditions of flow, to permit unaided automatic closing movement of said plunger.

3. An automatic self-closing valve, comprising, in combination with a main conducting channel for fluid having a zone of less cross-sectional area than that of the remainder of the channel, a valve-forming plunger movable in said channel in the vicinity of said zone, said plunger having its closing movement in the direction towards said zone, said plunger exposed at its opposite ends to the pressures in said main channel and in said zone, an annular body surrounding said plunger, and spaced from the internal wall of said channel, a balancing piston movable with said plunger, tubular connections between the opposite sides of said piston and the main channel and said zone, exhaust valves in said connections, each exhaust valve comprising two seats and a valve proper co-operative with said seats, and means serving normally to hold said plunger stable in open position but adapted to be overcome on predetermined variation of the differential pressure between the main channel and said zone occasioned by change of the conditions of flow, to permit unaided automatic closing movement of said plunger.

In testimony whereof I have signed my name to this specification.

OWEN A. PRICE.